United States Patent [19]

Modena et al.

[11] 4,113,689

[45] Sep. 12, 1978

[54] HALOGENATED ESTERS OF POLYCARBOXYLIC ACIDS AND PLASTICIZERS FOR CHLORO-VINYL POLYMERS BASED ON SAID ESTERS

[75] Inventors: Mario Modena, Bollate (Milan); Pietro Massardo; Lucio Castelnuovo, both of Milan, all of Italy

[73] Assignee: Montedison S.p.A., Milan, Italy

[21] Appl. No.: 695,748

[22] Filed: Jun. 9, 1976

Related U.S. Application Data

[63] Continuation of Ser. No. 463,363, Apr. 23, 1974, abandoned.

[30] Foreign Application Priority Data

Apr. 24, 1973 [IT] Italy ................ 23364 A/73

[51] Int. Cl.² ................................. C08K 5/10
[52] U.S. Cl. .................. 260/31.8 HA; 260/30.6 R; 260/31.8 G; 260/45.85 T; 560/76
[58] Field of Search ............... 260/31.8 HA, 475 N, 260/485 H, 31.8 G, 30.6 R, 45.85 T

[56] References Cited

U.S. PATENT DOCUMENTS

| 2,302,743 | 11/1942 | Carruthers | 260/31.8 H |
| 2,594,184 | 4/1952 | Ladd | 260/485 H |
| 2,613,221 | 10/1952 | Ladd et al. | 260/493 |
| 2,648,652 | 8/1953 | Schickh | 260/31.8 H |
| 2,724,643 | 11/1955 | Morris et al. | 260/31.8 H |
| 3,316,291 | 4/1967 | Dowbenko | 260/31.8 H |
| 3,823,183 | 7/1974 | D'Alelio | 260/485 H |

FOREIGN PATENT DOCUMENTS

| 675,279 | 7/1952 | United Kingdom. | |
| 1,094,723 | 12/1967 | United Kingdom | 260/48 SH |

*Primary Examiner*—James H. Derrington

[57] ABSTRACT

New halogenated esters of polycarboxylic acids are disclosed. The esters are useful, for instance, as particularly efficacious plasticizers for polymers and/or copolymers of vinyl chloride and/or vinylidene chloride. Compositions based on such polymeric materials and plasticized by means of the new halogenated esters of polycarboxylic acids are also disclosed.

7 Claims, No Drawings

The reactions involved in the preparation of compounds of formula (IV), Cl — CH$_2$ — CH = CCl$_2$, and formula (V), HO — CH$_2$ — CH = CCl$_2$, are illustrated below:

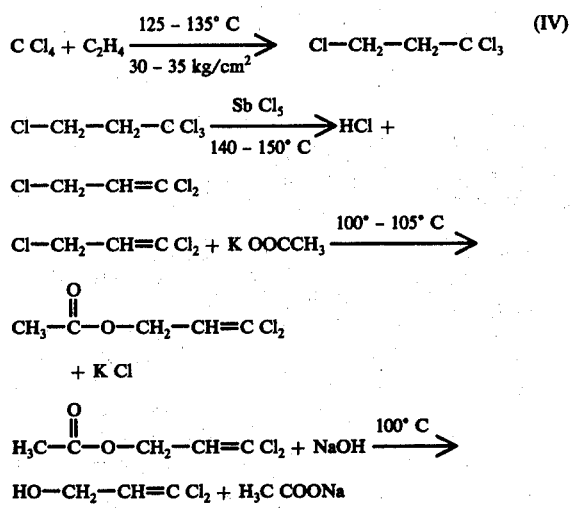

The halogenated esters of polycarboxylic acids according to this invention are particularly suited for use as plasticizers for chloro-vinyl polymeric materials, selected from the group consisting of polymers and/or copolymers of vinyl chloride and/or vinylidene chloride.

The polymeric material may be polyvinyl chloride (PVC), copolymers of vinyl chloride with olefins, vinyl esters, acrylic and/or metacrylic esters, acrylonitrile as well as graft copolymers of vinyl chloride on various types of synthetic or natural elastomers, vinylidene chloride, and copolymers thereof with vinyl chloride, acrylonitrile and the like.

The esters according to this invention may be present in the chloro-vinyl plasticized compositions in amounts varying within very wide ranges, in general between 1 and 150 parts by weight per 100 parts by weight of the polymeric material.

The quantity of the ester according to this invention which is present in the polymeric composition depends on various factors, among which must be mentioned the type of chlorovinyl polymer and the final use for which the plasticized composition is intended.

The esters according to this invention are used either alone or in admixture with other plasticizers, flame-retardant agents and other additives for chloro-vinyl polymers of the known type.

The present esters are particularly useful in chloro-vinyl polymer compositions endowed with good flame-resisting properties. In this case, in fact, the plasticizers according to the invention, when used in admixtures with phthalates and/or adipates of non-halogenated aliphatic alcohols, may be either totally or partially substituted for the phosphoric esters and/or Sb$_2$O$_3$ which have usually been employed for this purpose.

The plasticizers according to this invention are incorporated in the chloro-vinyl or chloro-vinylidene polymers according to conventional techniques and using conventional equipment.

The following examples are given to illustrate the essential aspects of the invention, and are not intended to be limiting.

EXAMPLE 1 bis(3.3) — dichloro-propenyl-phthalate — Preparation:

In a 5 liter autoclave for 5-6 hours, at 125°-135° C., 3080 g of CCl$_4$ and ethylene were reacted at a pressure of 30-35 kg/sq.cm., in the presence of 25.5 g of CuCl$_2$.2-H$_2$O and of 32.8 g of n-butyl amine.

The reaction product was then subjected to fractioned distillation and there was obtained a fraction having a boiling point of 59° C./24 mm Hg, consisting of 2330 g of 1, 1, 1, 3-tetrachloro-propane.

1000 g of the 1, 1, 1, 3-tetrachloro-propane, mixed with 5 g of SbCl$_5$, were fed dropwise into a glass reactor operating at 140°-150° C. and provided with a distillation column. Following the thermal-dehydrochlorination of the 1,1,1,3-tetrachloro-propane, a raw product was obtained essentially consisting of 1,1,3-trichloro-propene which, after stripping, amounted to 750 g of pure product with a boiling point of 132° C.

593 g of 1,1,3-trichloropropene were reacted for 6 hours at 100°-105° C. with potassium acetate (267 g of CH$_3$COOH and 289 g of KOH). The resulting reaction product was then filtered and treated with 30% by weight NaOH at 100° C. for 6-7 hours. After washing with water, the raw material was distilled, thereby obtaining 413 g of 3,3-dichloro-prop-2-ene-1-olo (boiling point = 70° C./10 mm Hg).

700 g of the 3,3-dichloroprop-2-ene-1-olo were reacted for 5 hours, in the presence of small quantities of paratoluenesulphonic acid with 300 g of phthalic anhydride, at 145° C.-150° C.

After washing with water and sodium bicarbonate, the low-boiling components were removed from the reaction product; by subsequent molecular distillation (at 135° C./10$^{-4}$ mm Hg), 576 g of a substance were obtained which, by elementary analysis, showed the following composition:

| Carbon | actual % = 43.9 | theoretical % = 43.7 |
|---|---|---|
| Hydrogen, | actual % = 2.6 | theoretical % = 2.6 |
| Chlorine, | actual % = 36.2 | theoretical % = 36.9 | which values are in good accordance with the theoretical values of bis(3,3-dichloropropenyl)-phthalate.

Other characteristics of this product were as follows:

| specific weight | 20°/20° C = 1.425 |
|---|---|
| refraction index | $n_D^{20}$ = 1.5555 |

— Infra-Red data: λmax. 1710 cm$^{-1}$ (C = O), 1622 cm$^{-1}$ (C = C). N. M. R. data: (Varian HA 100; tetramethylsylane was used as internal standard)
τ (CCl$_4$) 2.47 (4 H, m aromatic protons):
3.86 [(2 H, t, J 7Hz., 2(-CH = CCl$_2$)];
5.2 [(4H, d, J 7Hz., 2(-O-CH$_2$ - CH=)]
MASS: (Hitachi-Perkin-Elmer RM /6E)
384/386/388/390 (M$^+$ < 0.5%) 149 (C$_8$H$_5$O$_3^+$, 100%) 125/127/129 (C$_3$H$_3$Cl$_2$O$^+$, 3.7/2.2/0.5%); 109/111/113 (C$_3$H$_3$Cl$_2^+$ 46/30/5.5%)

EXAMPLE 2 bis(3,3-dichloropropenyl)adipate - Preparation:

62 g of 1,1,3-trichloro-propene, prepared according as described in Example 1, were reacted with 36.6 g of potassium adipate for 6 hours at 135° C. in the presence

HALOGENATED ESTERS OF POLYCARBOXYLIC ACIDS AND PLASTICIZERS FOR CHLORO-VINYL POLYMERS BASED ON SAID ESTERS

This is a continuation of application Ser. No. 463,363 filed Apr. 23, 1974 now abandoned.

THE PRIOR ART

Numerous esters of aliphatic and aromatic polycarboxylic acids and aliphatic and/or aromatic alcohols containing from 4 to 20 carbon atoms are known in the art, as is the suggestion to use such esters as plasticizers for polymers of chlorinated vinyl monomers, in particular polyvinylchloride (PVC).

In general such known esters are good, and in some instances even excellent, plasticizers for the chlorovinyl polymers, and often have, in addition, what is known as "good holding properties," by which is meant good permanence.

However, chlorovinyl polymers plasticized with the esters known in the art have self-extinguishing characteristics that are remarkably, and dangerously, lower than that of PVC itself. And as is well-known by those skilled in this art, the poor self-extinguishing properties of the polymers of chlorinated vinyl monomers plasticized by the esters available heretofore imposes considerable limits on the use of those compositions for special applications such as, for instance, as coatings for electrical cables, in upholstery, and the like.

In order to overcome such disadvantages, it has been suggested to introduce some organic and/or inorganic compounds capable of inhibiting combustion in the polymer/plasticizer blends. Alternatively, or contemporaneously, it becomes extremely convenient to reduce the content of combustible materials in the blends by partially or completely substituting the combustible plasticizers with products having both good self-extinguishing characteristics and good plasticizing properties.

Among the known products which are most commonly used for reducing the combustibles content are chlorinated paraffins which, however, have poor plasticizing efficiency, and phosphoric esters of aromatic and/or aliphatic hydroxy compounds.

THE PRESENT INVENTION

One object of this invention is to provide new compounds useful, for instance, as plasticizers for chlorovinyl polymers, and which are free of the drawbacks and disadvantages indicated above.

Another object is to provide plasticized compositions based on chlorovinyl polymers, in particular on PVC, and which do not have the disadvantages and drawbacks of the known chlorovinyl polymer/plasticizer blends.

These and other objects are achieved by means of halogenated esters of polycarboxylic acid which, in accordance with this invention, are compounds having the general formula (I):

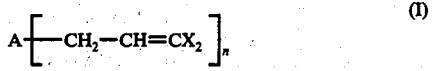

wherein X is a halogen and preferably chlorine, n is equal to 2 or 3, and A is a bivalent or trivalent radical of either type (II) or type (III):

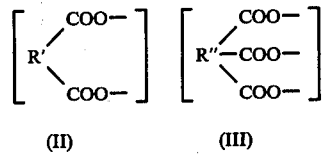

in which R' and R" represent saturated or unsaturated aliphatic or cycloaliphatic hydrocarbon radicals optionally halogen substituted, either bivalent or trivalent, or aromatic, optionally halogen-substituted, bivalent or trivalent hydrocarbon groups.

It has been found, surprisingly, that polymeric chlorovinyl compositions, plasticized with the esters of this invention, have a number of good characteristics.

More particularly, said compositions show flame-resisting properties that may be even superior to those of similar compositions containing phosphoric esters, combined with physicalmechanical characteristics altogether comparable to those of said compositions.

One group of preferred compounds according to this invention includes ester of carboxylic acids wherein, in the formulae (I), (II) and (III), X is chlorine, R' represents an alkylene, cyclo-alkylene or alkylidene group, optionally halogen-substituted, containing from 2 to 20 carbon atoms, or it represents a bivalent radical of the phenylene or naphthylene type or, alternatively, R" represents a trivalent hydrocarbon radical, optionally halogen-substituted, containing from 2 to 20 carbon atoms, of the aliphatic or cycloaliphatic type, or a trivalent hydrocarbon radical, optionally halogen-substituted, derived from benzene or naphthalene.

Specific examples of such compounds are represented by completely esterified products of
(a) dicarboxylic acids such as maleic, fumaric, citraconic, itaconic, mesaconic, glutaric, adipic, pimelic, suberic, azelaic, sebacic, phthalic, isophthalic, terephthalic acid and the like; or of
(b) tricarboxylic acids such as citric, trimellitic acid and the like; with compounds of the general formula (IV) or (V):

wherein X is any halogen but preferably chlorine.

The polycarboxylic acid esters according to this invention are prepared by methods generally known in the art. Particularly suitable methods involve:
(a) the reaction between the free polycarboxylic acid, anhydride or halide thereof and (V)

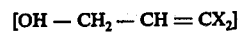

;
or
(b) the reaction between a metal salt, preferably an alkaline salt, of the carboxylic acid and (IV)

Compounds (IV) and (V) can also be prepared by methods generally known to the skilled in the art, such as by reacting ethylene with a tetrahalogen-methane, the subsequent dehydrohalogenation thereof (compound IV), the treatment with sodium acetate and final saponifying with NaOH (compound V).

of 2 g of triethylamine and 0.3 g of potassium iodide. The reaction product was then washed and freed of the low-boiling components by means of distillation under vacuum. By a successive molecular distillation (120° C./$10^{-4}$ mm Hg) 47 g of a substance were obtained which on elementary analysis showed the following composition:

| | | |
|---|---|---|
| carbon, | actual % = 40.5 | theoretical % = 39.6 |
| hydrogen, | actual % = 4.0 | theoretical % = 3.9 |
| chlorine, | actual % = 38.0 | theoretical % = 39.0 | well in accordance with the theoretical values typical for bis-(3,3-dichloro-propenyl)adipate.

Other characteristics of the product were as follows:
— specific weight at 20°/20° C. = 1.356
— refraction index $n_D^{20} = 1.5016$
I.R. λmax. 1728 cm$^{-1}$ (C = O) 1620 cm$^{-1}$ (C = C)
N.M.R.: τ (CCl$_4$) 3.95 (1 H, t, J 7Hz; -CH = CCl$_2$)
5.38, (2H, d, J, 7Hz.; - O - CH$_2$ - CH =)
7.68 (2H, complex, -CH$_2$ - $\overline{CO}$ —)
8.36 (2H, complex, -$\overline{CH_2}$ - CH$_2$ - CO$_2$ —)

MASS: 362/364/366/368 (M$^+$ < 0.5%)
237/239/241 (C$_9$H$_{11}$Cl$_2$O$_3^+$, 2.7/1.8/0.3%) 129 (C$_6$H$_9$O$_4^+$, 70%) 111 (C$_6$H$_7$O$_3^+$, 16%)
109/111/113 (C$_3$H$_3$Cl$_2$, 100/68/10%)

Use of bis-(3,3-dichloropropenyl)phthalate (°) and of bis(3,3-dichloropropenyl)adipate (°°) as plasticizers for PVC.
PVC-based polymeric blends were prepared, having the following compositons:

| Test number: | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PVC (1) | 100 | 100 | 100 | 100 | 100 | 100 | 100 | 100 | 100 | 100 | 100 | 100 | 100 | 100 | 100 |
| DOP (2) | — | — | — | — | — | — | 50 | 70 | 90 | — | — | — | — | — | — |
| TCP (3) | — | — | — | — | — | — | — | — | — | 50 | 70 | 90 | — | — | — |
| ODP (4) | — | — | — | — | — | — | — | — | — | — | — | — | 50 | 70 | 90 |
| Phthalate (°) (5) | 50 | 70 | 90 | — | — | — | — | — | — | — | — | — | — | — | — |
| Adipate (°°) (6) | — | — | — | 50 | 70 | 90 | — | — | — | — | — | — | — | — | — |
| Stabilizer (7) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Lubricant (8) | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |

(1) Polyvinyl chloride of the type commercially known as SICRON 548 (Trade Mark of MONTECATINI EDISON S.p.A., Milan, Italy) obtained through suspension polymerization and characterized by a K value = 70.
(2) bis(2-ethylhexylphthalate), of the type commercially known as SICOL 150 (Trade Mark of Montecatini Edison S.p.A. Milan, Italy), having the characteristics reported in the following TABLE I.
(3) Tricresylphosphate of the type commercially known as GARBEFLEX TCP of S. te MELLE-BEZONS (France) and having the properties reported in TABLE I.
(4) 2-ethylhexyl-diphenylphosphate, of the type commercially known as SANTICIZER 141 of MONSANTO CHEMICAL CO. USA, and having the properties reported in the TABLE I.
(5) bis(3,3-dichloropropenyl)phthalate, of the type described in Example 1 and having the properties reported in TABLE I.
(6) bis(3,3-dichloropropenyl)adipate, of the type described in Example 2, and having the properties reported in TABLE I which follows:

TABLE I

CHARACTERISTICS OF PURE PLASTICIZERS

| PLASTICIZER | SICOL 150 DOP | GARBEFLEX/ TCP TCP | SANTICIZER 141 ODP | PHTHALATE* | ADIPATE* |
|---|---|---|---|---|---|
| Specific Weight 20°/20° C | 0.9556 | 1.155 | 1.091 | 1.425 | 1.334 |
| Refraction Index $n_{20}^D$ | 1.4868 | 1.557 | 1.51 | 1.5555 | 1.5016 |
| Molecular Weight | 390 | 368 | 362 | 384 | 364 |
| Boiling Point ° C | 386 | 430 | 230 (5 mm Hg) | ~160 (0.5 mm Hg) | ~140 (0.5 mm Hg) |
| Glass transition Temperature ° C (°) | −80 | −56 | −88 | −70 | −89 |
| Volume resistivity at ° C: VRΩCm | 3.6 × 10$^{10}$ | <8 × 10$^7$ | 2.5 × 10$^8$ | 1.6 × 10$^8$ | — |

(°) The glass transition temperature (Tg) of the compounds used as plasticizers was determined by means of a differential Perkin-Elmer DSC/1B microcalorimeter into the standard container of which about 10–15 mg of substance were placed. The measuring cell was then cooled down with liquid nitrogen to 173° K, whereafter a heating at a standard rate of 16° C per minute was carried out. The Tg was taken in correspondence with the step observed on the recorded thermal-diagram.
(7) Stabilizer based on Ba-Cd soaps of the type commercially known as MARK 180 (1.2 parts) in admixture with kelating agent of the type commercially known as MARK C (0.3 parts), both produced by ARGUS Chemical Co. USA.
(8) Stearic acid.

The preparation of the PVC blends with the plasticizers and other additives was effected in the following way:

The polymer (PVC — Sicron 548) together with stabilizers and lubricants was loaded into a ribbon mixer, heated to a temperature of 80° C., and then after about 15 minutes of mixing, the plasticizer heated at 80° C. was slowly added.

The mixing was carried on for another 15 minutes, after the addition of the plasticizer.

The blend thus obtained was worked for 5 minutes at a temperature comprised between 150° and 170° C. (depending on the type of plasticizer concentration in the blend) in a laboratory roll-mixer, thereby obtaining sheets of 0.5 mm thickness.

From these sheets the plates were obtained from which, by compression-molding on a flat Carver type laboratory press, the test pieces were prepared to be used for the determination of the characteristics of the blends which are recorded in TABLE II.

| TEST NUMBER | 1 – 3 | | | 4 – 6 | | | 7 – 9 | | | 10 – 12 | | | 13 – 15 | | |
|---|---|---|---|---|---|---|---|---|---|---|---|---|---|---|---|
| Type and amount of plasticizer Parts by weight/100 parts by weight of PVC | PHTHALATE* | | | ADIPATE** | | | DOP | | | TCP | | | ODP | | |
| | 50 | 70 | 90 | 50 | 70 | 90 | 50 | 70 | 90 | 50 | 70 | 90 | 50 | 70 | 90 |
| CHARACTERISTICS | | | | | | | | | | | | | | | |
| Tensile (1) ASTM D-638 | | | | | | | | | | | | | | | |
| Strength at 100% elongation Kg/cm² | 170 | 95 | 63 | 135 | 65 | 42 | 112 | 62 | 40 | 158 | 96 | 49 | 91 | 51 | 36 |
| Elongation at break % | 310 | 360 | 420 | 320 | 390 | 440 | 360 | 430 | 470 | 300 | 370 | 430 | 320 | 390 | 420 |
| Tensile strength kg/cm² | 233 | 201 | 159 | 220 | 168 | 118 | 195 | 144 | 108 | 211 | 178 | 138 | 143 | 140 | 99 |
| Hardness (2) ASTM D-676 SHORE A Hardness - Value after 10 sec. | 89 | 76 | 66 | 82 | 70 | 58 | 80 | 66 | 55 | 84 | 68 | 60 | 77 | 64 | 54 |
| Brittleness temperature (3) Temperature at which there occurs 50% of break ° C | −4 | −19 | −26 | — | — | — | −27 | −35 | −44 | +2 | −11 | −19 | −27 | −38 | −46 |
| Torque (4) Clash-Berg Method | | | | | | | | | | | | | | | |
| Stiffening Temperature $T_f$ ° C | −1 | −20 | −31 | −25 | −45 | −57 | −25 | −40 | −44 | +4 | −10 | −20 | −18 | −37 | −58 |
| Efficiency temperature $T_e$ ° C | +29 | +13 | +1 | +25 | +5 | −12 | +23 | 0 | −9 | +28 | +13 | +2 | +18 | −3 | −37 |
| Efficiency coefficient at cold $C_f$ | | 78 | | | 50 | | | 50 | | | 103 | | | 58 | |
| Efficiency concentration $C_e$ | | 54 | | | 50 | | | 48 | | | 54 | | | 48 | |
| FLAME RESISTANCE (5) ASTM D2863-70 | | | | | | | | | | | | | | | |
| Oxygen index | 39.8 | 37.7 | 34.2 | 33.5 | 30.7 | 29.7 | 25.5 | 23.3 | 21.4 | 35.8 | 33.3 | 31.2 | 30.3 | 28.8 | 26.8 |
| RESISTANCE TO EXTRACTION AND VOLATILITY | | | | | | | | | | | | | | | |
| EXTRACTION (6) in Marsille soap 1%- %loss of plasticizer | | 1.42 | | | | | | 0.42 | | | 1.03 | | | 2.83 | |
| in 59 NaOH solution- % loss of plasticizer | | 0.67 | | | | | | 0.28 | | | 0.34 | | | 0.45 | |
| in Kerosene % loss of plasticizer | | 4.30 | | | | | | 26.90 | | | 3.33 | | | 15.62 | |
| VOLATILITY (7) Active-coal % loss of plasticizer | | 4.60 | | | | | | 3.66 | | | 2.18 | | | 3.00 | |

(1) The measurements were made according to ASTM-D-638 standards (separation speed of the clamps 50 cm/min.; type IV test piece).
(2) The measurements were made according to ASTM-D-676 standards at 23° C, taking the reading 10 seconds after the application of the load.
(3) The determination of the brittleness temperature was carried out by means of "ball-drop" tests (with the recording of the load/time graph), conducted at different temperatures on 25 × 6 × 2 mm sized test pieces, resting on their ends. Thus, as brittleness temperature is defined the temperature at which 50% of the tested specimens break in a brittle way (10 specimens for each temperature level taken into consideration).
(4) The method of determination followed was derived from the one described by the ASTM-D-1043 Standards, modified to avoid contact of the specimen with the refrigerating liquid and in order to carry out the reading of the load with the strain-stress remaining the same throughout the experimented temperature range. It became thus possible to determine the apparent elastic module E at 5", defined as:

$$E = 2750 \frac{T.L.}{a.\ b^3.\ n.\ \Phi}$$

wherein:

T = torque (twisting movement) in kg.cm
L = length of specimen in cm
a = width of specimen in cm
b = thickness of specimen in cm
n = parameter depending on a/b
Φ = twist angle in degrees over a wide range of temperatures.

The specimens sized ≃ 65 × 6 × 3 mm were conditioned before the test, for 5 minutes at 60° C. and then rapidly cooled to 23° C.

The evaluation was carried out on mixes with different concentrations of plasticizer, by determining:

(a) the stiffening temperature $T_f$ under torque, that is, the temperature in ° C. to which corresponds a value of E. app. at 5 sec. = 9500 kg/sq.cm.
(b) the efficiency temperature $T_e$, that is, the temperature in ° C. to which corresponds a value of E app. at 5 sec. = 125 kg/sq.cm.
(c) the efficiency-concentration $C_f$ in the cold that is, the concentration for which $T_f$ = −25° C.; and
(d) the efficiency concentration $C_e$, that is, the concentration for which $T_e$ = +25° C.

(5) The determination was carried out according to ASTM-D-2863/70 Standards at a flow rate of 4 cm/sec.
(6) Extraction Tests The resistance to extraction in the following liquids was evaluated:

(a) aqueous solution of 1% by weight of Marseille soap;
(b) a 5% by weight sodium hydrate aqueous solution; and
(c) kerosene.

The specimens (discs of 50 mm φ and 1.2 mm thickness), after conditioning for 40 hours at 23° C. with 50% of relative moisture, and after weighing, were immersed for 24 hours in the extracting liquid.

Thereupon they were conditioned for 4 hours at 80° C., cooled to room temperature and then again weighed. The result of the test was expressed as percent loss of plasticizer with respect to the quantity of same initially present, and it was defined by the following relationship:

$$\text{Percent loss} = \frac{W_1 - W_2}{W_1 \cdot A} \times 100$$

wherein:

$W_1$ = initial weight of specimen
$W_2$ = final weight of specimen
A = initial fraction by weight of plasticizer in the specimen.

(7) Volatility Tests:

The specimens (discs with 50 mm φ and 1.2 mm thickness), after conditioning for 40 hours at 23° C. and 50% of relative moisture, were weighed. Then, into glasses of 600 ml there was placed a certain quantity (120 ml) of KT4 type active coal on which a first specimen was then laid which in its turn was covered with another quantity of active coal, up to 3 specimens per each glass; the glasses were then placed in an air circulating oven for 24 hours at 87° C.

After such treatment, the test pieces were again conditioned, just as at the beginning of the tests, and then weighed.

The result is expressed as percent loss of plasticizer with respect to the quantity of plasticizer initially present, and is defined by the following relationship:

$$\% \text{ loss} = \frac{W_1 - W_2}{W_1 \cdot A} \times 100$$

wherein: $W_1$, $W_2$ and A had the same meaning as previously defined for the extraction tests.

From the results reported in TABLE II it appears quite clearly how effective the halogenated esters according to the invention are as plasticizers with high self-extinguishing characteristics for chloro-vinyl polymers.

The superiority of the phthalate (°) with respect to the TCP (tricresyl phosphate) in the inflammability test (greater oxygen index), coupled with a greater plasticizing efficiency at low temperatures (minor efficiency concentration at cold $C_f$) is evident.

The adipate (") in its turn, shows efficiency characteristics comparable, in their complex, to those of ODP which, amongst the plasticizers with good self-extinguishing characteristics is one with the greatest plasticizing efficiency (see the values of $C_e$ and $C_f$), although being superior to ODP in the inflammability test (higher oxygen index).

The superiority of haloagenated esters according to this invention appears quite evident also from the following considerations:

(a) a plasticizer with self-extinguishing characteristics in general is never used alone, but constitutes only a part of the plasticizing mixture; thus the usefulness of such a plasticizer is strictly connected with the possibility of using it in admixture with other plasticizers in the minimum quantity possible for imparting to the polymeric mixture pre-established self-extinguishing characteristics.

This reduced quantity is, obviously, so much the smaller the greater the self-extinguishing efficiency of the plasticizer itself; moreover, (b) since the ($C_e$, $C_f$) efficiency characteristics of the plasticizers properties in general are inferior to those of the other components of the plasticizing mixture, the efficiency of this latter proves to be so much the higher; the higher the efficiency of the component with a self-extinguishing action and the lower its concentration.

EXAMPLE 4

Use of bis(3,3-dichloropropenyl)phthalate in admixture with bis(isodecyl)phthalate as plasticizer composition for PVC Following the procedure described in example 3, polymeric blends were prepared having the compositions given in Table III hereinunder. From these compositions specimens were prepared to be used for the determination of the flame resistance properties (oxygen index according to ASTM D2863-70).

The thus obtained results are also recorded on the following Table III:

TABLE III

| Composition of blends | | | Test Comparison | 1 | 2 | 3 | 4 |
|---|---|---|---|---|---|---|---|
| SICRON 548 | (1) | parts by weight | 100 | 100 | 100 | 100 | 100 |
| Stabilizer | (2) | " | 6 | 6 | 6 | 6 | 6 |
| $Sb_2O_3$ | | " | 10 | 10 | 10 | 10 | 10 |
| Microcarb ($CaCO_3$) | | " | 30 | 30 | 30 | 30 | 30 |
| Phthalate (°) | (3) | " | — | 33 | 28 | 15 | 12 |
| DIDP | (4) | " | 20 | 20 | 25 | 38 | 41 |
| Disflamoll DPK | (5) | " | 25 | — | — | — | — |
| Disflamoll TOF | (6) | " | 8 | — | — | — | — |
| Oxygen index (ASTM D2863-70) | | | 30.5–31 | 35–35.5 | 35–35.5 | 31–31.5 | 31 |

(1) See note (1) to table given in example 3
(2) A mixture of basic lead salts (sulfate, phosphite and stearate)
(3) See note (5) to table given in example 3 and Table I
(4) bis(isodecyl)phthalate
(5) diphenylcresylphosphate, a commercial product of Farbenfabriken Bayer
(6) tris(ethylhexyl)phosphite, a commercial product of Farbenfabriken Bayer.

From the data of Table III, it is evident the strong efficiency of the compound according to the invention as flame-retardant plasticizer for PVC compositions.

More particularly the replacement of 33 p.b.w. of conventional flame-retardant plasticizer (see comparison test) with the same amount of phthalate (°) leads to a remarkable improvement in the oxygen index (30.5–31 vs 35–35.5); furthermore as it is evident from tests 2–4, the use of phthalate (°) permits to employ high amounts of DIDP, still having good values of oxygen index.

EXAMPLE 5

Use of phthalate (°) in admixture with DIDP as plasticizer compositions for polymeric blends based on PVC to be employed for the preparation of flame-resistant insulation for electric power cables Two polymeric blends based on PVC were prepared having the following composition:

| | | | |
|---|---|---|---|
| SIRCON 548 (1) | parts by weight | 100 | 100 |
| Stabilizer (2) | " | 6 | 6 |
| $Sb_2O_3$ | " | 10 | 10 |
| Microcarb ($CaCO_3$) | " | 30 | 30 |
| Disflamoll DPK | " | 25 | — |
| Disflamoll TOF | " | 8 | — |
| DIDP (3) | " | 20 | 41 |
| Phthalate (°) (4) | " | — | 12 |
| Blue dye | " | 0.3 | 0.3 |
| Bis-phenol A | " | 0.2 | 0.2 |

(1), (2), (3) and (4): see notes to Tables I and III.

The first blend was given as comparison test to the other blend which was according to the invention.

The components of the blends were mixed in a slow blender wherein firstly the solid components (except $CaCO_3$) were loaded and whereafter the plasticizers, heated at 60° C., were sprayed at 60° C.; when the temperature reached 80° C., $CaCO_3$ was added too.

The mixing was carried on for another 15 minutes after the addition of CaCO$_3$.

The dry-blend thus obtained was granulated on an extruder (Schloeman BT 80).

Following the procedure described in Example 3, the thus prepared granules were worked for 5 minutes at 150°–170° C. in a roll-mixer, thereby obtaining sheets of 0.5 mm thickness. These latter were used to make the plates from which, by compression-molding on a flat Carver type laboratory press, the specimens were prepared to be used for the determination of the following characteristics recorded on the following Table IV.

TABLE IV

| Characteristics | Comparison | Invention |
|---|---|---|
| Hardness (1) | 84 | 83 |
| Torque (2) | | |
| $T_i$ ° C | −14 | −15 |
| $T_f$ ° C | +28 | +33 |
| Flame resistance (3) | 30.5–31 | 31 |
| Resistance to extraction (4) | | |
| Marseille soap sol. | 0.41 | 0.13 |
| NaOH sol. | 0.23 | 0.20 |
| Kerosene | 2.37 | 1.97 |
| Volatility (5) | 1.47 | 0.48 |
| Dielectric constant (ASTM D150-64T) | | |
| at 10$^3$ Hz | 5.25 | 4.90 |
| at 10$^5$ Hz | 3.85 | 3.80 |
| Dissipation factor (ASTM D150-64T) | | |
| at 10$^3$ Hz | 0.112 | 0.09 |
| at 10$^5$ Hz | 0.095 | 0.08 |
| Volume resistivity (ASTM D257-61) | | |
| Ohm. cm | 7×10$^{13}$ | 34×10$^{13}$ |

(1) See note (2) to Table II
(2) See note (4) to Table II
(3) See note (5) to Table II
(4) See note (6) to Table II
(5) See note (7) to Table II Another portion of the granules prepared as above described was used for the preparation of electric power cable insulation. For this purpose use was made of an extruder (Bandera φ 45 mm) provided with a die for extruding the insulating sheet on a copper wire.

The mechanical, thermal and electrical characteristics of the thus obtained cables are given in the following Table V.

TABLE V

| PROPERTIES | TEST METHOD | STANDARD VALUE | COMPARISON | INVENTION |
|---|---|---|---|---|
| Specific weight | ASTM D-792 | | 1.46 g/cc | 1.48 g/cc |
| Shore A Hardness | ASTM D-1706 | | 82 | 86 |
| Cold flex temp. | ASTM D-1043 | | −17° C | −19° C |
| Insulation constant | MAN - 1093 | | 42 MΩKm | 735 MΩKm |
| Thermopressure | CEI 20.11 | residue thickness ≧60% | 75% | 62% |
| Heat shock | " | positive (1) | positive | positive |
| Cold bending | " | | | |
| as such | | positive | positive | positive |
| after ageing | | positive | negative (2) | positive |
| Tensile strength | " | | | |
| as such | | >12.5 N/mm$^2$ | 14.8 N/mm$^2$ | 16.4 N/mm$^2$ |
| after ageing | | >12.5 N/mm$^2$ | 15.2 N/mm$^2$ | 16.3 N/mm$^2$ |
| residual value % | | 80–120% | 103% | 99% |
| Elongation at breaking | CEI 20.11 | | | |
| as such | | >125% | 191% | 207% |
| after ageing | | >125% | 197% | 209% |
| residual value | | 80–120% | 103% | 101% |
| Oxygen index | ASTM D 2863 | | 30.5–31 | 31 |

(1) The specimens must be free from crackings
(2) The specimens show some crackings.

From the data of Table V, it can be easily seen that the cables prepared from PVC compositions containing the phthalate (°) according to the present invention are endowed with a complex of properties which are in general improved in comparison with those of cables prepared from PVC compositions containing organic phosphates as flame resistant plasticizers.

More particularly, the use of the phthalate (°) does actually improve:
— hardness
— mechanical properties
— insulation constant
— cold flex temperature while the oxygen index is practically the same and the thermopressure, even if lower, is well within the standard limit.

EXAMPLE 6

Preparation of tris(3,3-dichloropropenyl)trimellitate and its use as PVC plasticizer 48 g of trimellitic anhydride, 300 g of 3,3-dichloroprop-2-ene-1-ol, 0.75 g of p-toluensulfonic acid were heated at 130°–145° C. for 5 hours. After washing with water and distillation of low boiling components, 105 g of tris(3,3-dichloropropenyl) trimellitate were obtained having the following properties:

Elemental Analysis:

| | | |
|---|---|---|
| C % by weight | actual 40.2 | theoretical 40.32 |
| H % by weight | actual 2.2 | theoretical 2.35 |
| Cl % by weight | actual 39.3 | theoretical 39.66 |

NMR (Vanan H A 100; solvent CHCl$_3$; internal standard hexamethyl-disylane)

NMR (Vanan H A 100; solvent CHCl$_3$; internal standard hexamethyldisylane)

| | | |
|---|---|---|
| 3 aromatic protons not equivalent | τ1.81 | 1H, d, J = 2 Hz |
| | τ1.92 | 1H, quartet, J 8 Hz, J 2 Hz |
| | τ2.36 | 1H, d, J 8 Hz |
| 3 vinyl protons —CH=CCl$_2$ | τ3.86 | 3H, multiplet |
| 6 aliphatic protons 0—CH$_2$—CH | τ5.16 | 6H, multiplet |

Glass transition temperature Tg = −48° C. The triester above described was used as flame-resistant plasticizer in a polymeric blend having the following composition:

| | parts by weight | |
|---|---|---|
| PVC (1) | | 100 |
| Trimellitate (2) | " | 50 |
| Stabilizer (3) | " | 1.5 |

-continued

| Lubricant (4) | " | 0.15 |

(1) See note (1) in Example 3
(2) The triester prepared as above described
(3) See note (7) in Example 3.
(4) See note (8) in Example 3.

Following the procedure described in Example 3, the torque and flame-resistance properties were determined for this polymeric blend. The results thus obtained are hereinunder given:

Torque (1)
$T_f$ +14° C.
$T_e$ +42° C.

Flame resistance (2)
oxygen index 39.5–40

From these data, it becomes clearly evident that also this compound can be profitably used as flame-retardant plasticizer for PVC compositions.

(1) and (2): see notes to Table II.

What we claim is:

1. Plasticized compositions comprising polymers of chlorinated monomers selected from the group consisting of chlorovinyl and chlorovinylidene polymers and, per 100 parts by weight of said polymers, from 1 to 150 parts by weight of a halogenated ester of a carboxylic acid having the general formula $$A-[CH_2-CH=CX_2]_2 \quad \text{I}$$

in which X is halogen and A is a bivalent radical of formula $$\text{-OOC-R-COO-} \quad \text{II}$$

in which R is an aromatic hydrocarbon group.

2. Plasticized polymeric compositions according to claim 1, in which the polymer is polyvinyl chloride.

3. Plasticized polymeric compositions according to claim 1, in which the polymer is a copolymer of vinyl chloride and a monomer copolymerizable therewith.

4. Plasticized polymeric compositions according to claim 1, in which the polymer is a copolymer of vinylidene chloride and a monomer copolymerizable therewith.

5. Plasticized polymeric compositions according to claim 1, in which the plasticizing halogenated esters of polycarboxylic acid are present in admixture with other compounds known to have a plasticizing effect on the chloro-vinyl and chloro-vinylidene polymers.

6. Plasticized compositions according to claim 1, and further characterized in that, in the halogenated ester comprised therein, R in formula (II) is a phenylene or naphthalene radical.

7. Plasticized compositions according to claim 1, and further characterized in that the halogenated ester comprised therein is bis(3,3)dichloropropenyl phthalate.

* * * * *

UNITED STATES PATENT OFFICE
CERTIFICATE OF CORRECTION

Patent No. 4,113,689      Dated September 12, 1978

Inventor(s) Mario MODENA et al

It is certified that error appears in the above-identified patent and that said Letters Patent are hereby corrected as shown below:

Claim 1, line 7, the formula $$\text{'' A-CH}_2\text{-CH = CX}_2]_2 \text{ ''} \quad \text{should be}$$

$$\text{- - - A} \{ \text{CH}_2\text{-CH = CX}_2]_2 \text{ - - -}.$$

Signed and Sealed this

Ninth Day of September 1980

[SEAL]

*Attest:*

SIDNEY A. DIAMOND

*Attesting Officer*     *Commissioner of Patents and Trademarks*